United States Patent [19]

Schouhamer Immink

[11] Patent Number: 4,620,311
[45] Date of Patent: Oct. 28, 1986

[54] METHOD OF TRANSMITTING INFORMATION, ENCODING DEVICE FOR USE IN THE METHOD, AND DECODING DEVICE FOR USE IN THE METHOD

[75] Inventor: Kornelis A. Schouhamer Immink, Eindhoven, Netherlands

[73] Assignee: U.S. Philips Corporation, New York, N.Y.

[21] Appl. No.: 679,171

[22] Filed: Dec. 7, 1984

Related U.S. Application Data

[62] Division of Ser. No. 676,467, Nov. 29, 1984, Pat. No. 4,573,034.

[30] Foreign Application Priority Data

Jan. 20, 1984 [NL] Netherlands ......................... 8400187
Aug. 8, 1984 [NL] Netherlands ......................... 8402444

[51] Int. Cl.$^4$ ...................... H04L 25/49; H03M 7/14
[52] U.S. Cl. ...................................... 375/19; 371/56; 340/347 DD; 375/25
[58] Field of Search .............. 375/19, 25, 34; 371/55, 371/56; 340/347 DD; 360/39, 40, 48

[56] References Cited

U.S. PATENT DOCUMENTS

| | | | |
|---|---|---|---|
| 2,957,947 | 10/1960 | Bowers | 375/25 |
| 3,349,117 | 10/1967 | Cottermole | 375/25 |
| 3,783,383 | 1/1974 | Forster et al. | 371/56 |
| 3,911,395 | 10/1975 | Koike | 371/56 |
| 4,253,185 | 2/1981 | Danielson | 371/56 |

Primary Examiner—Benedict V. Safourek
Attorney, Agent, or Firm—Thomas A. Briody; William J. Streeter; Edward W. Goodman

[57] ABSTRACT

A method of converting n-bit information words into m-bit code words, and the other way round, is described. The code words have a limited disparity. For every information word, two code words are assigned to a group of information words, which code words can be derived from one another by inversion. A choice between these two code words is made to limit the digital-sum-value so as to obtain a d.c. free code. In order to obtain a further limitation of the digital-sum-value within the code words, these code words are derived from each other by inversion and reversal.

7 Claims, 31 Drawing Figures

| i | $S_0$ | $S_1$ | i | $S_0$ | $S_1$ | i | $S_0$ | $S_1$ | i | $S_0$ | $S_1$ |
|---|---|---|---|---|---|---|---|---|---|---|---|
| 0 | 171 | 171 | 64 | 589 | 589 | 128 | 619 | 166 | 192 | 921 | 408 |
| 1 | 173 | 173 | 65 | 590 | 590 | 129 | 427 | 169 | 193 | 489 | 417 |
| 2 | 174 | 174 | 66 | 595 | 595 | 130 | 683 | 170 | 194 | 745 | 418 |
| 3 | 179 | 179 | 67 | 597 | 597 | 131 | 811 | 172 | 195 | 873 | 420 |
| 4 | 181 | 181 | 68 | 598 | 598 | 132 | 459 | 177 | 196 | 937 | 424 |
| 5 | 182 | 182 | 69 | 601 | 601 | 133 | 715 | 178 | 197 | 190 | 523 |
| 6 | 185 | 185 | 70 | 602 | 602 | 134 | 843 | 180 | 198 | 318 | 525 |
| 7 | 186 | 186 | 71 | 611 | 611 | 135 | 907 | 184 | 199 | 574 | 526 |
| 8 | 203 | 203 | 72 | 613 | 613 | 136 | 243 | 195 | 200 | 222 | 531 |
| 9 | 205 | 205 | 73 | 614 | 614 | 137 | 371 | 197 | 201 | 350 | 533 |
| 10 | 206 | 206 | 74 | 617 | 617 | 138 | 627 | 198 | 202 | 606 | 534 |
| 11 | 211 | 211 | 75 | 618 | 618 | 139 | 435 | 201 | 203 | 414 | 537 |
| 12 | 213 | 213 | 76 | 651 | 651 | 140 | 691 | 202 | 204 | 670 | 538 |
| 13 | 214 | 214 | 77 | 653 | 653 | 141 | 819 | 204 | 205 | 798 | 540 |
| 14 | 217 | 217 | 78 | 654 | 654 | 142 | 467 | 209 | 206 | 238 | 547 |
| 15 | 218 | 218 | 79 | 659 | 659 | 143 | 723 | 210 | 207 | 366 | 549 |
| 16 | 227 | 227 | 80 | 661 | 661 | 144 | 851 | 212 | 208 | 622 | 550 |
| 17 | 229 | 229 | 81 | 662 | 662 | 145 | 915 | 216 | 209 | 430 | 553 |
| 18 | 230 | 230 | 82 | 665 | 665 | 146 | 483 | 225 | 210 | 686 | 554 |
| 19 | 233 | 233 | 83 | 666 | 666 | 147 | 739 | 226 | 211 | 814 | 556 |
| 20 | 234 | 234 | 84 | 675 | 675 | 148 | 867 | 228 | 212 | 462 | 561 |
| 21 | 299 | 299 | 85 | 677 | 677 | 149 | 931 | 232 | 213 | 718 | 562 |
| 22 | 301 | 301 | 86 | 678 | 678 | 150 | 189 | 267 | 214 | 846 | 564 |
| 23 | 302 | 302 | 87 | 681 | 681 | 151 | 317 | 269 | 215 | 910 | 568 |
| 24 | 307 | 307 | 88 | 682 | 682 | 152 | 573 | 270 | 216 | 246 | 579 |
| 25 | 309 | 309 | 89 | 175 | 43 | 153 | 221 | 275 | 217 | 374 | 581 |
| 26 | 310 | 310 | 90 | 303 | 45 | 154 | 349 | 277 | 218 | 630 | 582 |
| 27 | 313 | 313 | 91 | 559 | 46 | 155 | 605 | 278 | 219 | 438 | 585 |
| 28 | 314 | 314 | 92 | 207 | 51 | 156 | 413 | 281 | 220 | 694 | 586 |
| 29 | 331 | 331 | 93 | 335 | 53 | 157 | 669 | 282 | 221 | 822 | 588 |
| 30 | 333 | 333 | 94 | 591 | 54 | 158 | 797 | 284 | 222 | 470 | 593 |
| 31 | 334 | 334 | 95 | 399 | 57 | 159 | 237 | 291 | 223 | 726 | 594 |
| 32 | 339 | 339 | 96 | 655 | 58 | 160 | 365 | 293 | 224 | 854 | 596 |
| 33 | 341 | 341 | 97 | 783 | 60 | 161 | 621 | 294 | 225 | 918 | 600 |
| 34 | 342 | 342 | 98 | 183 | 75 | 162 | 429 | 297 | 226 | 486 | 609 |
| 35 | 345 | 345 | 99 | 311 | 77 | 163 | 685 | 298 | 227 | 742 | 610 |
| 36 | 346 | 346 | 100 | 567 | 78 | 164 | 813 | 300 | 228 | 870 | 612 |
| 37 | 355 | 355 | 101 | 215 | 83 | 165 | 461 | 305 | 229 | 934 | 616 |
| 38 | 357 | 357 | 102 | 343 | 85 | 166 | 717 | 306 | 230 | 250 | 643 |
| 39 | 358 | 358 | 103 | 599 | 86 | 167 | 845 | 308 | 231 | 378 | 645 |
| 40 | 361 | 361 | 104 | 407 | 89 | 168 | 909 | 312 | 232 | 634 | 646 |
| 41 | 362 | 362 | 105 | 663 | 90 | 169 | 245 | 323 | 233 | 442 | 649 |
| 42 | 395 | 395 | 106 | 791 | 92 | 170 | 373 | 325 | 234 | 698 | 650 |
| 43 | 397 | 397 | 107 | 231 | 99 | 171 | 629 | 326 | 235 | 826 | 652 |
| 44 | 398 | 398 | 108 | 359 | 101 | 172 | 437 | 329 | 236 | 474 | 657 |
| 45 | 403 | 403 | 109 | 615 | 102 | 173 | 693 | 330 | 237 | 730 | 658 |
| 46 | 405 | 405 | 110 | 423 | 105 | 174 | 821 | 332 | 238 | 858 | 660 |
| 47 | 406 | 406 | 111 | 679 | 106 | 175 | 469 | 337 | 239 | 922 | 664 |
| 48 | 409 | 409 | 112 | 807 | 108 | 176 | 725 | 338 | 240 | 490 | 673 |
| 49 | 410 | 410 | 113 | 455 | 113 | 177 | 853 | 340 | 241 | 746 | 674 |
| 50 | 419 | 419 | 114 | 711 | 114 | 178 | 917 | 344 | 242 | 874 | 676 |
| 51 | 421 | 421 | 115 | 839 | 116 | 179 | 485 | 353 | 243 | 938 | 680 |
| 52 | 422 | 422 | 116 | 903 | 120 | 180 | 741 | 354 | 244 | 936 | 87 |
| 53 | 425 | 425 | 117 | 187 | 139 | 181 | 869 | 356 | 245 | 872 | 91 |
| 54 | 426 | 426 | 118 | 315 | 141 | 182 | 933 | 360 | 246 | 744 | 93 |
| 55 | 555 | 555 | 119 | 571 | 142 | 183 | 249 | 387 | 247 | 488 | 94 |
| 56 | 557 | 557 | 120 | 219 | 147 | 184 | 377 | 389 | 248 | 920 | 103 |
| 57 | 558 | 558 | 121 | 347 | 149 | 185 | 633 | 390 | 249 | 856 | 107 |
| 58 | 563 | 563 | 122 | 603 | 150 | 186 | 441 | 393 | 250 | 728 | 109 |
| 59 | 565 | 565 | 123 | 411 | 153 | 187 | 697 | 394 | 251 | 472 | 110 |
| 60 | 566 | 566 | 124 | 667 | 154 | 188 | 825 | 396 | 252 | 824 | 115 |
| 61 | 569 | 569 | 125 | 795 | 156 | 189 | 473 | 401 | 253 | 696 | 117 |
| 62 | 570 | 570 | 126 | 235 | 163 | 190 | 729 | 402 | 254 | 440 | 118 |
| 63 | 587 | 587 | 127 | 363 | 165 | 191 | 857 | 404 | 255 | 632 | 121 |

FIG. 13

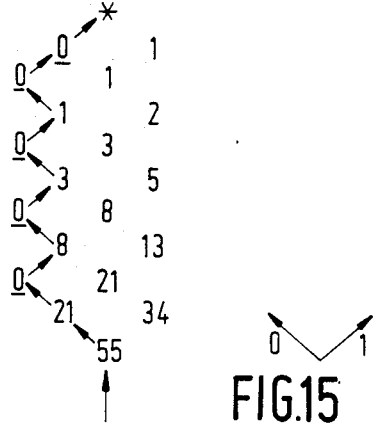
FIG.14
FIG.15
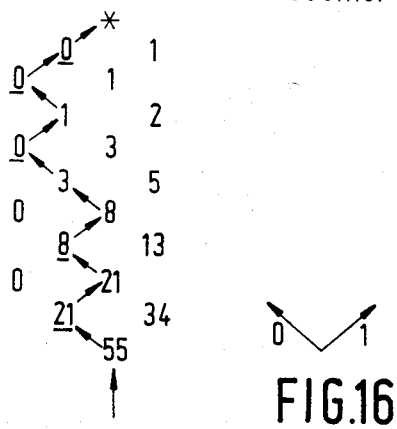
FIG.16
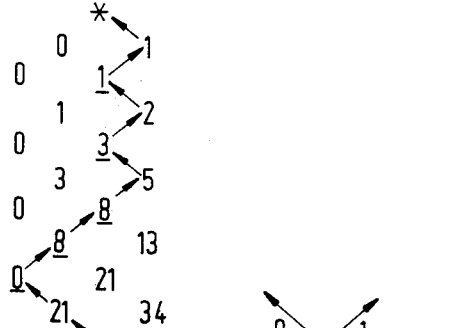
FIG.17
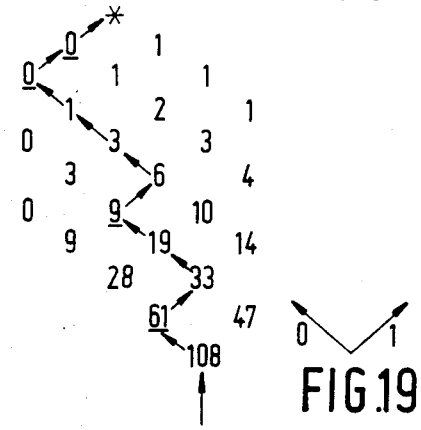
FIG.18
FIG.19

00001111 ="15" ⇒
0001001101 = "77"

00010001 = "17" ⇒
0001001111 = "79"

| i | $S_0$ | $S_1$ |
|---|---|---|
| 93 | 625 | 53 |
| 94 | 604 | 54 |
| 97 | 620 | 60 |
| 116 | 433 | 120 |
| 135 | 779 | 184 |
| 145 | 787 | 216 |
| 149 | 803 | 232 |
| 168 | 781 | 312 |
| 178 | 789 | 344 |
| 182 | 805 | 360 |
| 183 | 241 | 387 |
| 192 | 793 | 408 |
| 196 | 809 | 424 |
| 198 | 316 | 525 |
| 199 | 572 | 526 |
| 215 | 782 | 568 |
| 225 | 790 | 600 |
| 229 | 806 | 616 |
| 230 | 242 | 643 |
| 239 | 794 | 664 |
| 243 | 810 | 680 |
| 244 | 376 | 122 |
| 248 | 856 | 107 |
| 249 | 728 | 109 |
| 250 | 472 | 110 |
| 251 | 824 | 115 |
| 252 | 696 | 117 |
| 253 | 440 | 118 |
| 254 | 632 | 121 |
| 255 | 868 | 155 |

FIG. 31

METHOD OF TRANSMITTING INFORMATION, ENCODING DEVICE FOR USE IN THE METHOD, AND DECODING DEVICE FOR USE IN THE METHOD

CROSS-REFERENCE TO RELATED APPLICATION

This application is a division of application Ser. No. 676,467, filed Nov. 29, 1984, now U.S. Pat. No. 4,573,034.

BACKGROUND OF THE INVENTION

This invention relates to a method of transmitting information, in which n-bit information words are converted into m-bit code words before transmission and said m-bit code words are re-converted into n-bit information words after transmission, and in which, for converting consecutive n-bit code words into m-bit information words with a limited maximum disparity $\pm d$ prior to transmission, where n, m and d are integers which comply with $n<m$ and $d<m$, in such a way that the digital sum value taken over all the preceding code words at the beginning of a code word remains limited to a range which is bounded by a first and a second value, the following code word is selected, at least with respect to the polarity of the disparity, as a function of said digtal sum value over all the preceding code words so as to ensure that said following code word cannot cause an increase of the absolute value of said digital sum value, for which purpose a pair of code words is assigned to at least a first group of possible n-bit information words, the code words of said pair having opposite disparities with an absolute value d and being the bit-by bit inverse of one another for each associated information word.

The invention also relates to an encoding device for use in the method, for converting n-bit information words into m-bit code words and to a decoding device for use in the method, for converting m-bit code words into n-bit information words.

Such a method and such devices are known inter alia from GB-PS No. 1,540,617 and U.S. Pat. No. 4,387,364.

Such a conversion of n-bit information words into m-bit code words is employed in order to meet specific requirements imposed on the series of m-bit code words. This means that not all the possible combinations of m-bit code words in every possible sequence are allowed, so that the number of bits m is necessarily larger than the number of bits n of the associated information words. In the known method and devices, m may be even, or odd. If m is even the disparity 0 will occur in addition to the even disparities $\pm 2$, $\pm 4$ etc., and if m is odd the disparities $\pm 1$, $\pm 3$ etc. will occur. The maximum disparity is then $\pm m$. This maximum disparity is limited ($d<m$) to achieve a maximum code efficiency; raising the maximum disparity will result in a less-than-proportional increase of the number of possible code words, whereas the low-frequency content of the spectrum and the maximum number of successive ones or zeros (important for the clock generation) will increase substantially. The polarity is chosen as a function of the digital sum value over the preceding code words in order to obtain a d.c.-free transmission signal. This can be achieved in an advantageous manner by selecting for every information word, two code words which are the inverse of one another, so that only one of the two code words need be generated because the other word can be found by inversion.

Another important aspect is the generation of a decision level at the receiving end in order to decide whether a received bit is a logic 0 or a logic 1. This may be achieved by filtering the instantaneous digital-sum-value level. It is important that the time constant of the filter used for this purpose is as small as possible to enable rapid variations of the average digital-sum-value level to be followed. Therefore, it is essential to limit the amplitude of instantaneous digital-sum-value, variations may give rise to variations of said decision level (baseline wander). To this end limits may be imposed on the maximum excursion within the code words, for example by limiting the maximum instantaneous digital-sum-value to $\pm(d+2)$. This often means that there is a substantial surplus of permissible code words in comparison with the required number $2^n$. However, a reduction of this range to $\pm(d+1)$ results in an insufficient number of possible code words and an asymmetrical limitation to, for example, $+(d+1)$ and $-(d+2)$ makes no sense when the inversion principle is used because in that case all the pairs of code words of which one word is not within said limits will not conform, so that the number of possible code words is not larger than in the case of a limitation to the levels $\pm(d+1)$. The same applies to other limits, for example $\pm(d+3)$ in comparison with $\pm(d+2)$.

SUMMARY OF THE INVENTION

The invention aims at providing a method of the type specified in the opening paragraph and an encoding device and a decoding device for use in said method which enable the instantaneous sum-value level to be limited asymmetrically without abandoning the inversion principle. According to the invention, the method is characterized in that for limiting the instantaneous digital-sum-value to a range which is bounded by a third and a fourth value, which third and fourth values are situated outside the range bounded by the first and the second value in such a way that the spacing between the second and the fourth value is smaller than the spacing between the third and the first value, first and second code words with a disparity $+d$ and $-d$, respectively, are assigned to at least a part of the first group of code words, which second code words of said part of the first group for every associated information word are the bit-by-bit inverses of the first code words whose transmission sequence has been reversed, said first code words having been selected from at least that group of code words which, in conformity with said selection rule, remain within the range which is bounded by the third and the fourth value, while the corresponding bit-by-bit inverted code word does not remain within said range and, after reversal of the transmission sequence, does remain within said range.

The invention is based on the recognition of the fact that in the case of the known method, an asymmetrical limitation yields no improvement because code words which vary from the first value to the third value will vary from the second value to a value in excess of the fourth value after they have been inverted and are therefore not permissible, so that the number of code words found is not larger than in the case that the third value is situated at the same spacing from the first value as the spacing of the fourth value from the second value, but that such an inversion does lead to a permissible code word if, at the same time, the transmission sequence is reversed because then, provided that the non-inverted and non-reversed code word does not exceed said fourth value, said inverted and reversed code word will neither exceed said value, resulting in an extension of the number of possible code words in comparison with the situation in which inversion alone is applied. It is then found that these additional code words can be distinguished unambiguously from other code words. In principle, it is possible to reverse the transmission sequence of other those words which would exceed said fourth value without said reversal. However, often it is simpler to reverse and invert all the words so that no distinction has to be made between the two types of words.

The method in accordance with the invention may be characterized further in that after transmission of the code words, it is checked whether they exhibit a disparity $+d$ or $-d$, and code words belonging to said part of the first group of information words are converted directly or after bit-by-bit inversion and reversal of the transmission sequence, depending on the polarity of the disparity.

Preferably, the method in accordance with the invention is characterized in that the maximum disparity $\pm d$ is equal to the minimum possible disparity and is unequal to zero, so that the digital-sum-value taken over all the preceding code words at the beginning of a code word remains limited to either the first a value or the second value, which values are spaced from each other, and the first code words which belong to the first group of information words cause said digital sum value to vary from the first value to the second value, while the associated second code words cause said digital-sum-value to vary from the second value, a selection being made from the first code words to encode an information word of the first group if the digital-sum value exhibits the first value at the beginning of the code word and the bit-by-bit inverse of the code word whose transmission sequence has been reversed being selected if the digital-sum-value exhibits the second value at the beginning of the code word.

Preferably, this method may be characterized further in that the maximum disparity $\pm d$ is equal to $\pm 2$ and code words of zero disparity are assigned to a second group of information words, which code words are selected independently of the digital-sum-value at the beginning of the code word, which do not exceed the third value when they vary from the first value to the first value, and which do not exceed the fourth value when they vary from the second value to the second value.

This preferred method may be characterized further in that $n=8$ and $m=10$ and the third value is situated at a spacing 2 from the first value and the fourth value is situated at a spacing 1 from the second value.

An encoding device for use in the method in accordance with the invention may be characterized by:
  means for determining the digital-sum-value taken over all the preceding words,
  means for converting the information words of the first group,
  means for inverting the reversing the code words obtained by converting information words of the first group if this is required by the digital-sum-value thus determined.

A decoding device for use in the method in accordance with the invention may be characterized by:
  means for determining the disparity of the code words received,
    means for inverting and reversing the code words which correspond to information words of the first group as this is required by the disparity found, and
    means for converting the code words corresponding to information words of the first group.

DESCRIPTION OF THE DRAWINGS

The invention will now be described in more detail, by way of example, with reference to the drawings in which:

FIG. 13 is a table of code words;

FIGS. 14 to 19 show a number of modified Pascal triangles to explain an encoding and decoding method;

FIG. 31 is a modification to the table shown in FIG. 13.

DESCRIPTION OF THE PREFERRED EMBODIMENT

Figure 1:
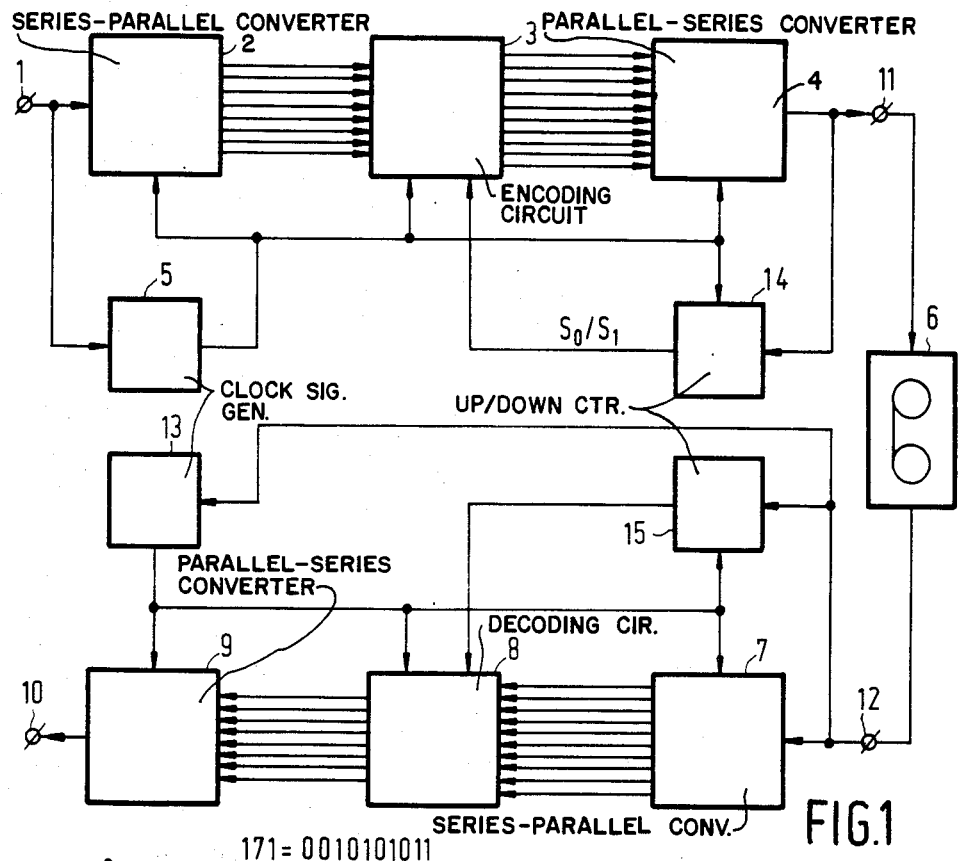
FIG. 1 shows an apparatus using the method of encoding and decoding digital data in order to keep the digital-sum-value of the encoded signal within specific limits.

FIG. 1 shows an apparatus employing a system of encoding and decoding digital data in such a way that the digital sum value of the encoded signal remains within specific limits. The apparatus comprises an input 1 for receiving serial input data (unless the data is already available in parallel form) and a series-to-parallel converter 2 for arranging the data as parallel words, in the present example 8-bit parallel words. These 8-bit words are applied to an encoding circuit 3, for example, in the form of a look-up table which, in the present case, generates a 10-bit output word for every input word in conformity with the rules for which said circuit has been laid out. These 10-bit words are converted into a serial data sequence by means of a parallel-to-series converter 4, which data sequence is, for example, recorded on a magnetic tape by means of a conventional analog magnetic tape recorder 6. It is possible, for example, to record a plurality of parallel tracks, for example 20. The process is synchronized by clock signals which are derived from the input signal by means of a clock-signal generator circuit 5.

In principle, decoding is possible by means of the same circuit operated in the reverse sequence. The signal from the tape recorder 6 is converted into 10-bit words by means of a series-to-parallel converter 7 (unless the data is already available in the form of 10-bit words). Using rules which are complementary to those employed for encoding, these 10-bit words are converted into 8-bit words by means of a decoding circuit 8, which words are subsequently converted into a serial data stream on output 10 by means of a parallel-to-series converter 9. This process is again synchronized by clock signals obtained by means of the clock-signal generator circuit 13, said clock signals being derived from the signals from the recorder 6 which appear on input 12 of the series-to-parallel converter 7.

In order to limit the digital-sum-value, it is, in principle, possible to admit only code words with equal numbers of ones and zeros, i.e. code words which, in their totality, do not affect the digital-sum-value. In particular, if limits are also imposed on the digital-sum-values within the code word, the number of code words which can be formed with a specific number of bits, in the present example 10, is so small that this limited number of code words with said number of bits can be decoded only into input words with a substantially smaller number of bits, resulting in a substantial reduction in channel capacity. If this loss of capacity is to be minimized, for example, as in the case of a conversion from 8 into 10 bits, code words with unequal numbers of zeros and ones, i.e. with a digital-sum-value variation or a disparity unequal to zero, should be allowed, as has been proposed in GB-PS No. 1540617. In this Patent Specification, it has been proposed to admit words with a minimum disparity unequal to zero, in particular ±2, for code words comprising an even number of bits and to assign an output word with a disparity +2 and a disparity −2 to every input word and to select that word which reduces the digital-sum-value, i.e. the integral of the disparities of all the preceding words. In the apparatus shown in FIG. 1, this is achieved by determining the digital-sum-value of all the preceding words by means of an up/down counter 14 which counts down for every logic zero and which counts up for every logic one, and by generating a logic signal $S_0/S_1$ depending on this count, which signal indicates whether said digital-sum-value exhibits a high ($S_1$) or a low ($S_0$) value of two possible values. In the case of a low value $S_0$, the next input word is converted into a word of zero or +2 disparity in conformity with the obtaining rules or look-up tables, so that the digital-sum-value remains $S_0$ or becomes $S_1$ ($S_1=S_0+2$), respectively, and in the case of a high value $S_1$, said input word is converted into a word of zero or −2 disparity, so that the digital-sum-value remains $S_1$ or becomes $S_0$ ($S_0=S_1-2$), respectively.

During decoding, the digital-sum-value of all the words read out previously is determined by means of the up/down counter 15 and, depending on this, it is determined whether a word of 0 or +2 disparity or, conversely, a word of a 0 or −2 disparity has been selected as the next code word during encoding. The decoding circuit 8 is controlled in conformity with this. Thus, by means of rules or look-up tables, both the encoding circuit 3 and the decoding circuit 8 provide a set of code words $S_0$ which is valid if the digital-sum-value of all the preceding words is $S_0$, and a set of code words $S_1$ which is valid if the digital-sum-value of all the preceding words is $S_1$.

In accordance with the afore-mentioned British Patent Specification, the one set $S_1$ can be derived simply from the other set $S_0$ if the words of 0 disparity are selected to be identical to, and words of −2 disparity are selected to be complementary to the words of +2 disparity.

The choice of the code words will be explained with reference to FIGS. 2 to 12 which show diagrams which give the instantaneous digital-sum-values of a code word as a function of the bit number. The words are 10-bit code words with the most significant bits at position 1. The digital-sum-value, which ranges from +3 to −2, has been plotted vertically. Thus, six digital-sum-values are possible. The code words are given both in binary representation and in decimal representation.

Figure 2:
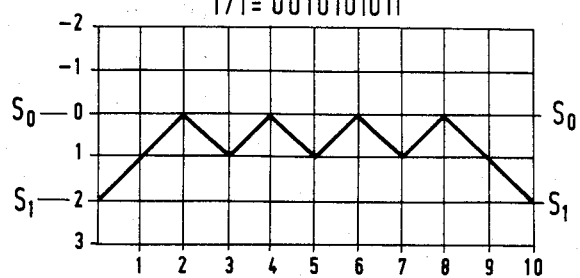
FIGS. 2 to 12 inclusive show a number of Trellis diagrams to explain the choice of the code words.
Figure 3:
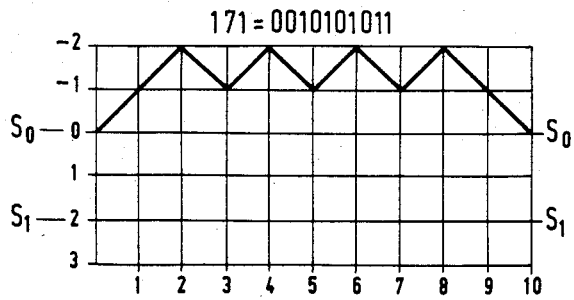

FIG. 2 shows the digital-sum-value variation of a code word of zero disparity, the digital-sum-value preceding said code word being $S_1$. By way of example, the code word 171=0010101011 has been selected. Every 1 increments the digital-sum-value by one and every 0 decrements the digital-sum-value by one. The relevant code word starts with a value $S_1$ and ends with a value $S_1$, remaining within the specified digital-sum-value limits +3 and −2. FIG. 3 shows the same code word beginning with a value $S_0$. The variation then also remains within the specified limits −2 and +3.

Figure 4:
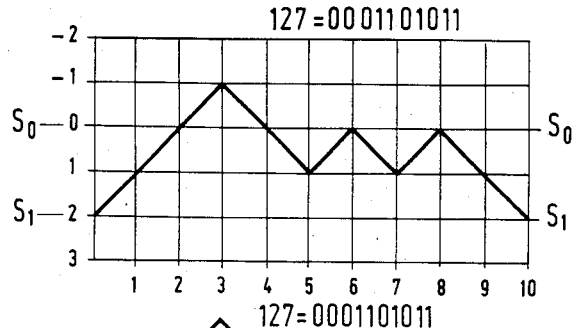
Figure 5:
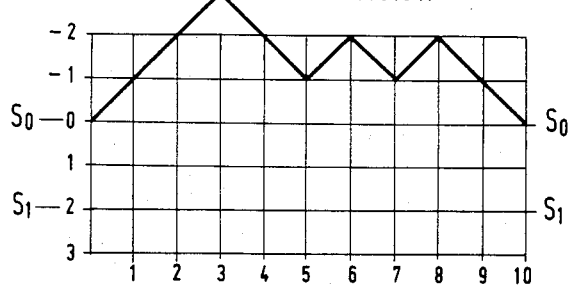

FIG. 4 shows the variation of the code word 127=0001101011 starting from a digital-sum-value $S_1$. This word remains within the limits −3 and +2. However, if this word starts with a digital-sum-value $S_0$, as shown in FIG. 5, this word will not remain within the specified limits. The word 127, therefore, does not belong to the group of words of zero disparity which remains within the specified limits. It is evident that only those words of zero disparity which remain within the specified digital-sum-value limit regardless of the initial situation ($S_0$ or $S_1$) all have a digital-sum-value variation which, starting from the initial value, remains between +1 and −2.

Figure 6:
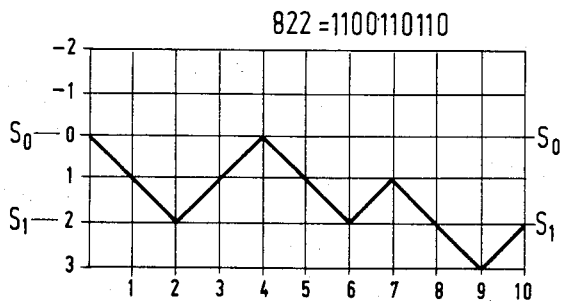
Figure 7:
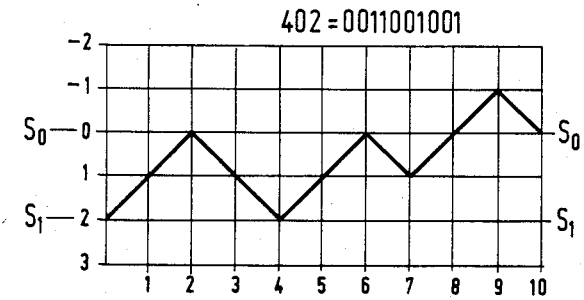

FIG. 6 shows the variation of the digital-sum-value of the word 822=1100110110 of −2 disparity, i.e. it appears only in the case of an initial state $S_0$. This word remains within the specified limits. Should the initial state $S_1$ be required, the inverse code word would have to be selected in accordance with the afore-mentioned British Patent Specification, namely the word 402=0011001001, whose digital-sum-value variation, as shown in FIG. 7, also remains within the specified limits.

Figure 8:
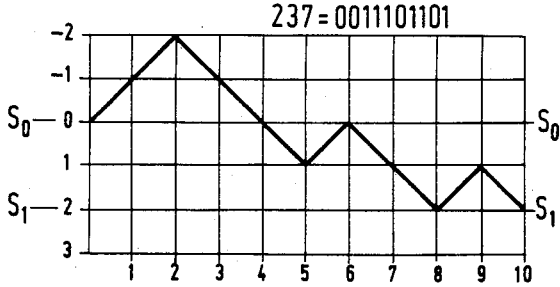
Figure 9:
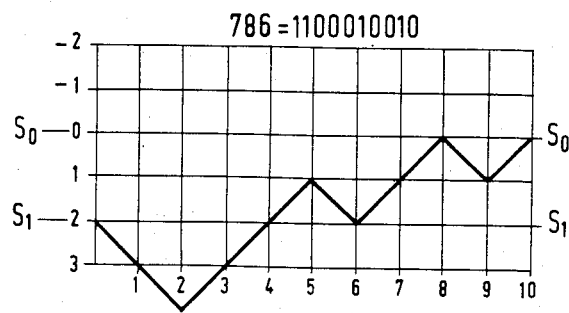
Figure 10:
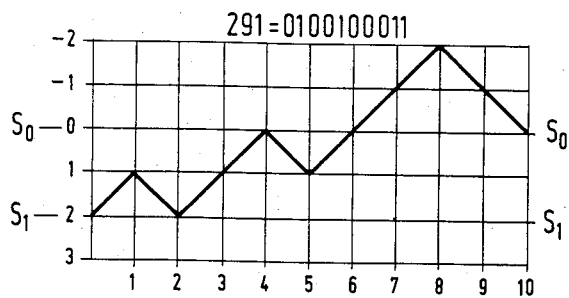

FIG. 8 shows the variation of the word 237=0011101101 of a −1 disparity, which variation remains within the specified limits. However, if this word is inverted in the initial state $S_1$, this results in the word 786=1100010010 which, as is shown in FIG. 9, does not remain within the specified limits. This means that not all words of −2 disparity which remain within the specified limits can be used when the inversion technique is employed, because some of these words are no longer permissible after inversion. A solution to this is not only to invert the word but also to reverse it, i.e. to reverse the transmission sequence. The word then becomes 291=0100100011 whose variation remains within the specified limits, as is shown in FIG. 10. A comparison of FIGS. 8 and 10 shows that an inversion plus reversal is, in effect, a mirror-inversion of the diagram about the vertical axis halfway the words. It follows that each word of −2 disparity which remains within the specified limits from the initial value $S_1$, also remains within the specified limits after inversion, yielding +2 disparity, and reversal from the initial state $S_1$. Thus, all words of −2 disparity may be used, enabling the coding to be optimized as regards loss of channel capacity or limitation of the instantaneous digital-sum-value variation (up to 6 values in the present example).

The foregoing results in two groups of code words:

Group $T_0$: all code words of 0 disparity which remain within the specified limits regardless of the initial state, Group $T_1$: all the code words of ±2 disparity which depend on the initial state and which can be derived from each other by inversion and reversal, the words corresponding to the initial state $S_0$ having +2 disparity and the words corresponding to an initial state $S_0$ having −2 disparity.

It is to be noted that, in principle, it is possible to invert as well as reverse only those words with a +2 disparity which reach the value −2 when going from state $S_0$ to state $S_1$ and which consequently reach said value −2 after reversal and inversion going from the state $S_1$ to the state $S_0$. Thus, three groups are obtained; the group $T_0$, the group $T_1$, which is limited to those words of ±2 disparity which reach the level −2 and which can thus be identified, and the group $T_1'$, which is limited to those words of ±2 disparity which do not reach the level −2 (for example, the word 822 in FIG. 6).

If only words of groups $T_0$ and, $T_1$ (and as the case may be, the group $T_1'$) occur, decoding is possible regardless of what happened previously. Indeed, the disparity of the word itself is indicative of the decoding rule: disparity +2 means decoding from the initial state $S_0$; disparity −2 means decoding from the initial state $S_1$, and disparity 0 means decoding regardless of the initial state. The up/down counter 15 (FIG. 1) merely serves to determine the disparity of the word received. This does not give rise to error propagation when an erroneous initial state is detected. Indeed, the initial state of each word is determined independently of its history. It is then possible to incorporate one table in the decoding circuit, for example, the table corresponding to the initial state $S_0$, the words being converted after inversion and reversal when the disparity is −2, and directly when the disparity is ±2 or 0.

Figure 11:
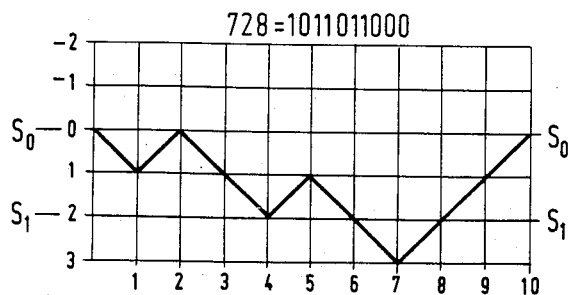
Figure 12:
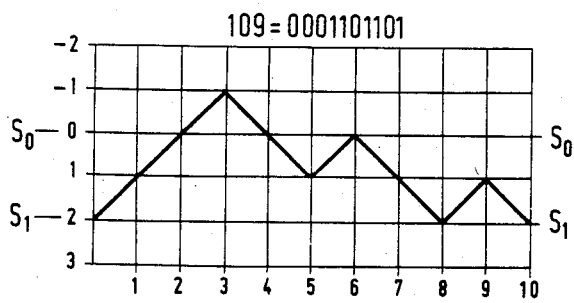

It may happen, as in the case of the 8-to-10 conversion described in the foregoing, that the number of code words which can be found in accordance with the above rules, is inadequate for the specified limits. In the case of an 8-to-10 conversion, 256 different (8-bit) input words are possible, for each of which a 10-bit output word must be selected. The group $T_0$ comprises 89 code words and the group $T_1$ comprises 155 code words, so that there is a discrepancy of 12 code words. These words may then be selected from those words of 0 disparity which are possible from one of the two initial states $S_0$ and $S_1$ but not from the other state. It is then possible to choose from the group of words which begin with three logic zeros from the initial state $S_1$ and which are formed by reversal (without inversion!) from a group of words which end with three zeros from the initial state $S_0$. FIG. 11 shows an example of such a word ending with three zeros (initial state $S_0$) and FIG. 12 shows an example of the word after reversal (initial state $S_1$). During decoding, the initial state can be determined simply from the fact that the word begins (initial state $S_1$) or ends (initial state $S_0$) with three zeros while the disparity is zero. FIG. 13 is a table giving the 256 8-bit input words i and the associated 10-bit output words in both the state $S_0$ and the state $S_1$ in decimal notation. The first group $T_0$ is formed by the input words $0 \leq i \leq 88$, the second group $T_1$ by the input words $89 \leq i \leq 243$, and the third group $T_2$ by the words $244 \leq i \leq 255$.

The conversion of 8-bit input words into 10-bit output words can be effected by storing the table of FIG. 13, if necessary limited to one of the two states $S_0$ or $S_1$, in a memory, but this may present problems in view of the required storage capacity, However, it is known, inter alia from IEEE Transactions on Information Theory, May 1972, pages 395–399, Schalkwijk, and from the same magazine, December 1973, pages 1438–1441, to arrange code words of a specific disparity (−2 in the Schalkwijk method) lexicographically by means of a Pascal triangle whose elements have been selected in conformity with the Newton binominal, so that the input code word can be converted directly into the output code word, and vice versa, by storing only the elements of said Pascal triangle. Via this Pascal triangle, a sequence number is assigned to all the output code words with said disparity. The series of sequence numbers is uninterrupted, so that an unambiguous code word conversion can be obtained by relating the 8-bit input words to the sequence numbers in conformity with their binary weights. However, if, as in the present case, not all the words with this disparity are permissible owing to a limitation of the maximum excursion of the digital-sum-value within the code word in conformity with the diagrams shown in FIGS. 1 to 10, this encoding and decoding method is not possible. Indeed, some of the words of the series of 10-bit output code words to which sequence numbers have been assigned via the Pascal triangle, are not permissible. Therefore, the permissible 10-bit code words cannot be provided with an uninterrupted series of sequence numbers by means of the Pascal triangle, so that the 8-bit input words cannot be wrapped onto the 10-bit output code words in conformity with their sequence numbers, which depend on their binary weights, via the Pascal triangle, or the other way round. However, if a modified Pascal triangle is used in conformity with the rules described with reference to FIG. 14, this is found to possible again.

FIG. 14 shows an example of such a modified Pascal triangle obtained in conformity with the following general rules:

(1) Select as many columns k as there are possible digital-sum-value levels within the permissible group of code words. In the present example, k=4 in conformity with the number of levels within the group $T_0$ (four levels are possible both from $S_1$ and from $S_0$). Add one auxiliary column (5th column).

(2) Select as many rows r as there are bits in the output word. In the present example r=10 because of the 8-to-10 bit conversion.

(3) Select one column as the starting column in conformity with the starting level $S_0$ or $S_1$ in the diagrams of FIGS. 1 to 10. In the present example, this is the column k=3, so that a digital-sum-value variation between +1 and −2 is possible within the word in conformity with the group $T_0$. An end column is then found by moving a number of columns in conformity with the disparity of the group (in the present case 0).

(4) Enter a 1 at the first row in the column to the right of the end column.

(5) Fill the matrix from top to bottom by adding, at every position, the sum of the two numbers situated diagonally above said position, with the proviso that always a zero is inserted in the first column and the number diagonally above it in the fourth column is inserted in the auxiliary column. In this way, the matrix shown in FIG. 14 is obtained. The number in the fifth column have been parenthesized because they have no function once the matrix has been formed. Above the 3rd column (end column), an asterisk has been placed because the encoding the decoding methods to be described hereinafter always terminate at this point. Numbers outside the diagonals which originate from the asterisk and the diagonals which originate from the starting number 55 in the 10th row and the 3rd column neither play a part and have also been parenthesized. The other numbers, which do play a part, may, for example, be stored in a memory.

The encoding method proceeds as follows: the sequence number of the input word is compared with the starting number (55). If this sequence number is higher than or equal to the starting number, the starting number is subtrated from the sequence number and the vector "1" is followed to the number situated diagonally above it to the right, while a logic one is supplied. If the sequence number is smaller, the method proceeds directly to the next sequence number at the top left, while a logic zero is supplied. This operation is repeated for every following number until eventually the asterisk is reached.

During decoding, the method is reversed. Starting is effected at the starting number (55). Upon receipt of a logic one the diagonal to the top right is followed and the number is accumulated; upon receipt of logic zero the diagonal to the to left is followed without said number being accumulated. At every position, the same operation is carried out until the asterisk is reached, the number obtained by accumulation constituting the sequence number of the word obtained by decoding. In practice, the binary weight of this word will be chosen as the sequence number, which is effected directly by adding the numbers of the modified Pascal triangle as binary numbers.

FIG. 15 shows a first example to illustrate the operation of the encoding and decoding method. The selected input word is the 8-bit word 00000000 with the decimal sequence number 0. The number 55 cannot be subtrated from this sequence number, so that it is necessary to step to the top left to the number 21, a logic 0 being supplied. The number 21 cannot be subtracted, so that again it is necessary to step to the top left and to supply a logic 0, so that the number 0 is reached. From this number, 0 can be subtracted (remainder 0), so that the next step is to the top right and a logic one is supplied; the number 8 at this position cannot be subtracted from the remainder zero, so that again a step to the top left is made and a logic zero is supplied etc., the path indicated by the arrows being followed towards the asterisk. The entire 10-bit output word is then 0010101011, which corresponds to the decimal value 171 (1st word in Table 13).

During decoding, starting is again effected at 55. A logic zero is received and a step to the top left is made. The following logic zero again necessitates a step to the top left. The next logic one requires a step to the top right and an accumulation of the number situated at the beginning of this step, in the present case zero. The 10-bit word 0010101011 then leads to an 8-bit output word will the sequence number zero=00000000 via the indicated path.

FIG. 16 illustrates the use of a modified Pascal triangle for encoding the word 00011101 with the sequence number (=binary weight) 29. Starting is effected at the number 55. This is higher than 29, so that a step is made to the top left to the number 21 and a logic zero is supplied. The number 21 is smaller, so that a step to the top right is made and a logic one is supplied, the number 21 being subtracted which yields 29−21=8. The next number (21) is higher, so that a logic zero is supplied and a step is made to the top left. The number then found (8) can be subtracted, so that zero remains. Then a step to the top right is made and a logic one is supplied. The method proceeds in this way until the asterisk is reached. The complete output word is then 0101001011 (331 in the table of FIG. 13).

The 10-bit word 0101001011 is decoded as follows. The first bit is zero, so that a step to the top left is made; the second bit is 1, so that a step is made from this position, with the number 21, to the top right and this number 21 is accumulated. The following bit is again zero, so that a step to the top left is made to the number 8, from which under the command of the fourth bit (which, is a logic one), a step to the top right is made, said number 8 being accumulated. Finally, the asterisk is reached with the number 29=00011101 in the accumulator.

FIG. 17 shows how the 8-bit word 00010100=20 is encoded into the 10-bit word 0011101010=234. Encoding proceeds as follows. The starting word is larger than the input word 00010100=20. A step to the top left is made and a logic zero is supplied. The number 21 then reached is also higher than 20. Again a logic zero is supplied and a step to the top left is made, where a zero is found. This number zero can be subtracted from the number 20 and with the remainder 20−0=20, a step to the top right is made and a logic one is supplied. From this position, a logic one and with the remainder 20−8=12, a step to the top right is made and another step with the remainder 12−8=4. The number now reached is 5, which is higher than 4, so that a step to the top left is made and a logic zero is supplied, yielding the number 3 which can be subtracted from 4, after which, with the remainder 4−3=1, a step to the top right to the number 2 is made and a logic one is supplied. This number 2 cannot be subtracted from the remainder 1, so that a logic zero is supplied and a step to the top left is made to the number 1, which can be subtracted from 1, so that again a logic one is supplied and, with the remainder 1−1=0, a step to the top right is made, where the higher number 1 initiates the last step towards the asterisk, a logic zero being supplied. Thus, the output word 0011101010=234 (in conformity with the table of FIG. 13) is formed from the input word 00010100=20. During decoding, the same path is followed under accumulation of the numbers 0, 0, 8, 8, 3 and 1, yielding 20=00010100.

The foregoing demonstrates that this method can never lead to words with an instantaneous digital-sum-value variation beyond the specified limits. Indeed, when the first column is reached, this is always followed by a step to the top right, because zero can always be subtrated from the instantaneous remainder. The fourth column always leads to a step to the top left, which is easy to see when it is assumed that the instantaneous remainder would necessitate a step to the top right. The remainder would then be larger than or equal to a previous number, so that the fourth column would not be reached. Assume, for example, that in the fourth column, 3rd row, the number 2 is reached. A step to the top right would require a remainder of 3 or higher.

However, this cannot be achieved by a step from the 4th row, 3rd column (number 3) to the top right.

A similar assumption for row 5, column four would require a remainder higher than or equal to 5. However, this would mean that at the 6th row, 2nd column, the remainder would have been higher than $8+8+5=21$, which, at this position, would have meant a step to the top right instead of to the top left.

The fact that an uninterrupted series of numbers, in the present example ranging from zero to 88, can be encoded in this way is easy to verify by trying out all the possibilities.

FIG. 18 illustrates how a modified Pascal triangle for decoding the group $T_1$ is obtained. Here, the initial state $S_1$ has been selected. The group having the initial state $S_0$ is then obtained by reversal plus inversion. The digital-sum-value variation within the word is then $+1$ and $-4$, so that six columns are required, using the 5th column as the starting column. Had the reverse situation been selected, i.e. initial state $S_0$, the variation would be between $+3$ and $-2$, so that again six columns would be required with the third column as the starting column. The disparity from $S_1$ is $-2$, so that the third column is found as the end column (see asterisk) (in the complementary case the 5th column would be found as the end column). Thus, in the fourth column, first row, the number one is entered and a zero at any other relevant position in said row. Further, the matrix is filled in accordance with the rules, the nonrelevant numbers being parenthesized (and being omitted in FIG. 19).

FIG. 19 shows how the number $01000110=70$ is encoded and how the result is decoded. Encoding starts in the 5th column with the number 108. This cannot be subtracted from 70, so that a step to the top left is made and a logic zero is supplied, upon which the number 61 is reached. This number can be subtracted from 70, so that with the remainder $70-61=9$, a step to the top right is made and a logic one is supplied, yielding the number 33 which cannot be subtracted from said remainder 9, as a result of which a logic zero is supplied and a step is made to the top left to 19 and thence to 9 at the sixth row. This number can be subtracted, so that with the remainder $9-9=0$, a step to the top right is made to the number 6 and a logic one is supplied. This number cannot be subtracted from the remainder zero, so that a logic one is supplied and a step to the top left is made, which is repeated twice, (a logic zero being supplied each time) until zero is reached at the second row, which can be subtracted from zero yielding a remainder zero, with which a step is made to the asterisk, while a logic one is supplied. In this way, the word $0100100011=291$ is found. Decoding is again effected in conformity with the rules along the path indicated by the arrows. Accumulation of the numbers from which steps to the top right are made (upon receipt of a logic one) then yields the numbers $61+9+0+0=70$. This pair of number 70 and 291 cannot be found in the table of FIG. 13 because the sequence numbers 0 to 88 belong to the group $T_0$ and are encoded and decoded in conformity with the modified Pascal triangle of FIG. 14. The sequence numbers of the group $T_1$ are obtained by adding 89 to the binary weight, so that the binary number 70 corresponds to the sequence number $70+89=159$ in the table. Another possibility is to increment all the numbers on the diagonal, which extends from the number 108 to the top left, by 89 in the memory in which the Pascal triangle of FIG. 8 is stored, so that automatically one additional accumulation of the number 89 is effected during decoding, namely, when the first step to the top right is made (not later than the fifth bit), while during encoding, the number 89 is additionally subtracted once.

In principle, it is possible to increment all the numbers in the triangle by a speicfic amount because all the words contain an equal number of ones. The lexicographical value multiplied by the number of ones is then incremented by said amount. This incrementation may be effected diagonally, because one step to the right is made for each diagonal. The number of diagonals which extend to the top left, including the diagonal which terminates at the asterisk, corresponds to the number of ones. This incrementation need not be applied to the numbers in the last column because no step to the top right is made from this column. This alternative may be used only for decoding the code words. During encoding, it is only allowed to increment said diagonal which originates from the starting point 1.

In this respect, it is denoted that in the Schalkwijk reference using the unmodified Pascal triangle, always the difference between two diagonally situated numbers of the Pascal triangle is taken instead of the number from which a step is made, the operation being terminated at the number of at the apex of the triangle instead of at the asterisk. This corresponds to a displacement of all the elements of the matrix over one row and one column. Indeed, said difference is always situated to the top left of the relevant number.

Figure 20:
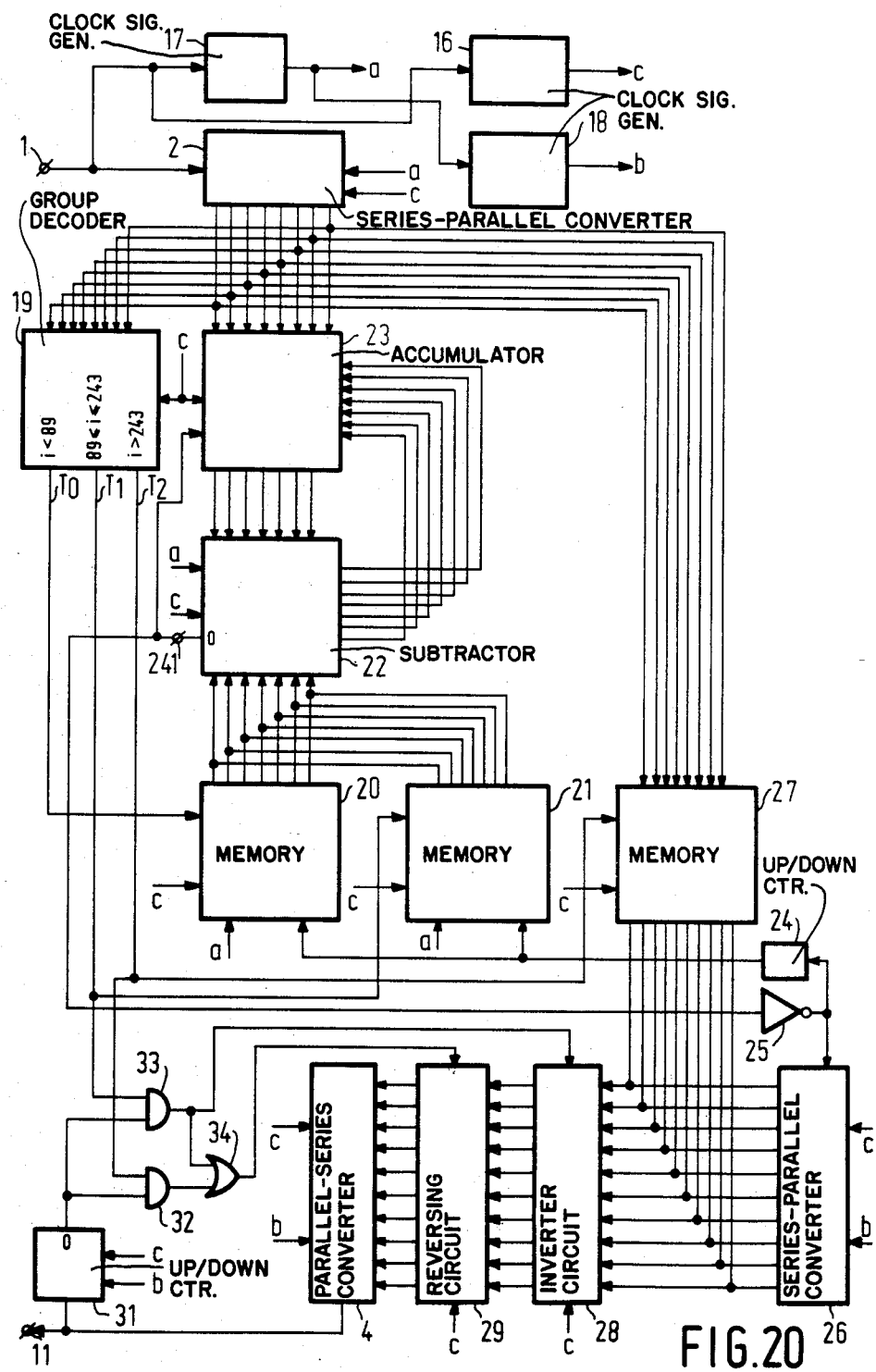
FIG. 20 shows an example of an encoding circuit employing the principles described with reference to FIGS. 14 to 19.

FIG. 20 shows an example of an encoding circuit which employs the principles described with reference to the foregoing Figures. A serial 8-bit signal on input 1 is converted into a 8-bit parallel signal by means of a series-to-parallel converter 2. Further, a word-synchronous clock signal c is generated by means of a clock-signal generator 16, and an 8-bit synchronous clock signal a is generated by means of a clock-signal generator 17. Further, a clock signal b, which is in synchronism with the bit frequency of the output signal to be formed, i.e. a frequency which is 10/8 times the frequency of the clock signals a, is formed by means of the clock-signal generator 18, which clock signals b are applied to the various parts of the encoding circuit for synchronizing purposes. The 8-bit output of the series-to-parallel converter 2 is connected to a group-decoder circuit 19 which generates a signal $T_0$, $T_1$ or $T_2$, for example by means of logic gates, when the binary weight i of the 8-bit word complies with $i<89$; $89 \leq i \leq 243$, and $i>243$, respectively; these are the three previously defined groups of input words which are each encoded in a separate manner. The arrangement further comprises a memory 20 which is switched on by the signal $T_0$ and which contains the modified Pascal triangle shown in FIG. 14, which memory is arranged in parallel with a memory 21 which can be switched on by the signal $T_1$ and which contains the modified Pascal triangle shown in FIG. 18. The outputs of the two memories are connected to a subtractor circuit 22, which subtracts the number supplied by the memory 20 or 21 from the number supplied by an accumulator 23. The output of the subtractor circuit, is also connected to the accumulator 23. The input word received from the series-to-parallel converter 2 is loaded into the accumulator 23 under command of the clock signal c. The memories 20 and 21 are row-addressed by the bit clock signal a, causing shift by a one row after every bit in such a way that the modified Pascal triangle (FIGS. 14, 18) is stepped through from bottom to top. With respect to the column addressing, the third column of memory 20 (shown in FIG. 14) or the fifth column of memory 21 (shown in FIG. 18) is selected as the starting column under control of the clock signal c. In the subtractor circuit 22, the number read out is subtracted from the number supplied by the accumulator 23 and the remainder is stored in said accumultor 23 if it is higher than or equal to zero, which can be achieved by inhibiting the reloading of said accumulator 23 with an overflow signal on an output 241 of the subtractor circuit 22. The overflow signal, which has been inverted by means of the inverter 25, determines the column addresses of the memories 20, 21 via an up/down counter 24 which decrements the column number by one when said overflow signal appears (or the number in the memory cannot be subtracted) and which increments the column number by one if this signal does not occur (or the number in the memory can be subtracted from the number in the accumulator). The inverted overflow signal then also constitutes the desired output signal. Indeed, this number is a logic one when the number can be subtracted from the number in the accumulator 23, and a logic zero when the number cannot be subtracted. When group $T_1$ is processed, the initial sequence number may be subtracted when the input signal is loaded into the accumulator 23 under command of the signal $T_1$ or allowance may be made for this in the numbers contained in the memory 21 (in a manner as described with reference to FIG. 19).

By means of the series-to-parallel converter 26, the inverted overflow signal is converted into a 10-bit parallel signal (using the clock signal b).

The apparatus further comprises a memory circuit 27 which receives the 8-bit parallel input word from the series-to-parallel converter 2, which is energized by the signal $T_2$, and which contains the code words of said third group $T_2$, so that under command of the signal $T_2$, the 10-bit code words of the third group are generated as a function of the relevant 8-bit input words. Said 10-bit words, which are available in parallel form, are applied to the output of the series-to-parallel converter 26 via a wiredor, so that on this output, all the 10-bit code words appear in the rhythm of the 8-bit input words but are encoded in conformity with the initial state $S_1$. Via a switchable inverting gate circuit 28 and a switchable reversing gate circuit 29, these 10-bit words are applied to the parallel-to-series converter 4, which supplies the encoded bit stream on output 11. By means of an up/down counter 31, which is word-synchronized via the clock signal c, the digital-sum-value of all the preceding words is integrated. If this digital-sum-value for all the preceding words is zero, the initial state $S_0$ is valid, while encoding has been effected in the initial state $S_1$. In that case, the next word, if this is a word from group $T_1$, should be inverted and reversed and, if it is a word from group $T_2$, it should be reversed only. For this purpose, the output signal of said up/down counter 31 is logically combined with the signals $T_1$ and $T_2$ via gates 32, 33 and 34 to obtain signals which energize the inverting circuit 28 and/or the reversing circuit 29 in said cases.

Figure 21:
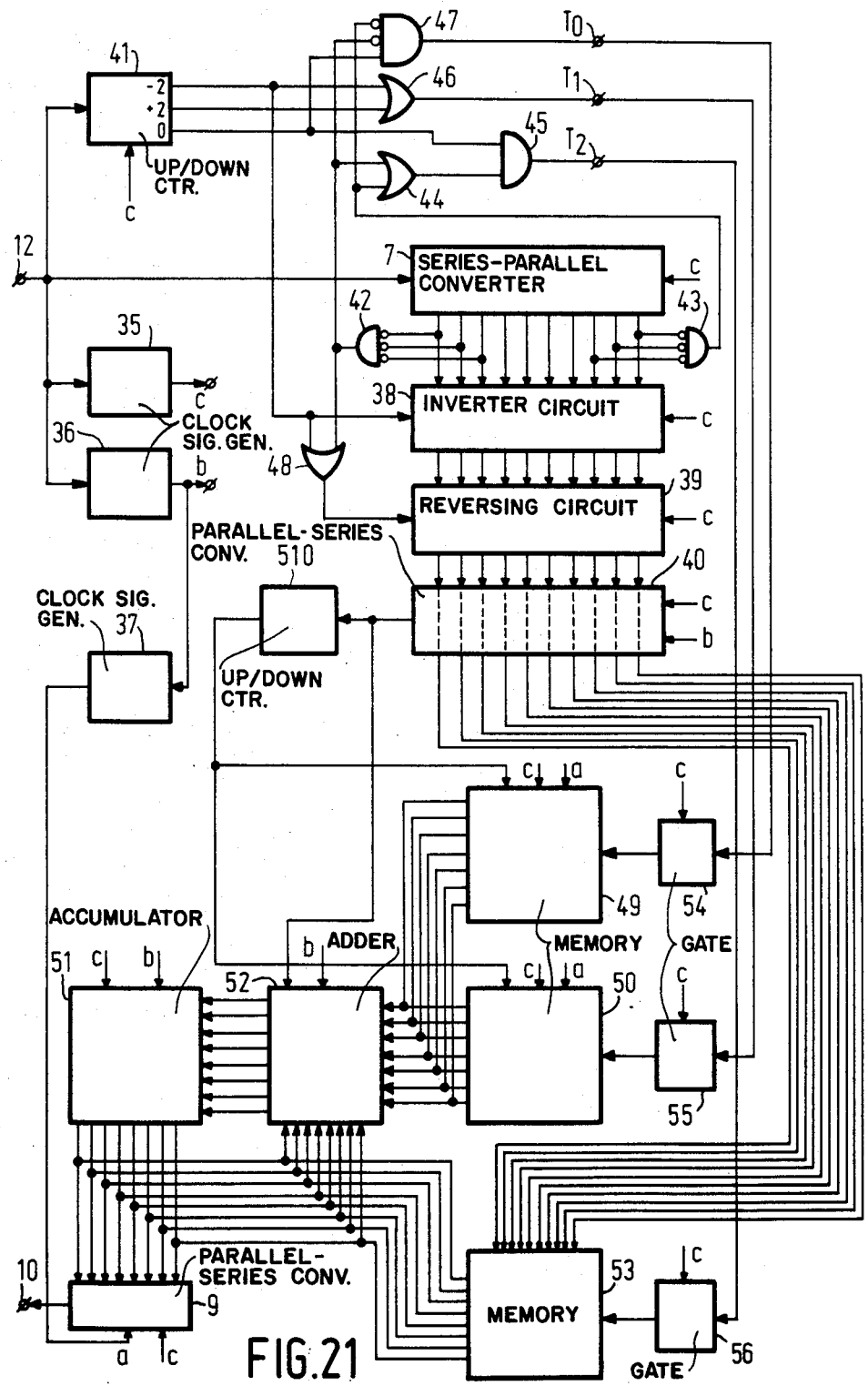
FIG. 21 shows an example of a decoding circuit employing the principles described with reference to FIGS. 14 to 19.

FIG. 21 shows a decoding circuit for decoding 10-bit words which have been encoded by means of the encoding circuit shown in FIG. 20. Via an input 12, the 10-bit words are applied to the series-to-parallel converter 7 as a serial bit stream to be converted into a 10-bit parallel bit stream. By means of clock-generated circuits 35, 36 and 37, the clock signals c, b, and a, respectively, are generated, which signals are synchronous with the word frequency, the bit frequency of the 10-bit words, and the bit frequency of the 8-bit words, respectively.

It is necessary to determine whether each word of the incoming bit series has been encoded in the state $S_0$ or $S_1$ and to which of the groups $T_0$, $T_1$ or $T_2$ is belongs. For this purpose, the 10-bit words are applied to an up/down counter 41, which is synchronized by the wordclock signal c, and at the end of every word, indicates the disparity (the digital-sum-value variation within said word). This may be $-2$, $+2$ or 0. The three least significant bits of the output signal of the series-to-parallel converter 7 are monitored by the AND-gate 42 and the three most significant bits are monitored by the AND-gate 43, both gates having inverting inputs which supply a signal when the relevant bits are zero, i.e. in the state $S_0$ and $S_1$, respectively, in the case of a word of group $T_2$.

If the counter 41 has detected zero disparity and either gate 42 or gate 41 supplies an output signal, the word belongs to group $T_2$. For this purpose, the output signals of gates 42 and 43 are combined in the OR-gate 44 and the output signal of this OR-gate 44 is combined with the 0-disparity output signal of the counter 41 in AND-gate 45 to form a signal which identifies a word of group $T_2$. OR-gate 46 combines the $+2$ disparity output signal of counter 41 and the $-2$ disparity output signal to form a signal which identifies a word of group $T_1$, which words have a disparity of $\pm 2$. The 0 disparity signal from counter 41 is indicative of the group $T_0$ when gates 42 and 43 do not supply an output signal, which is detected by means of gate 47, which consequently supplies a signal which identifies a word of group $T_0$.

In the same way as the encoding circuit shown in FIG. 20, the decoding circuit shown in FIG. 21 starts from the state $S_1$ and words in the state $S_1$ are converted by inversion and/or reversal. Words of group $T_1$ in the state $S_0$ can be identified in that they have $-2$ disparity, so that in the case of $-2$ disparity, it is necessary to invert and reverse. Words of group $T_2$ in the state $S_0$ can be identified from the fact that the three least significant bits are zero, i.e. from the fact that gate 42 supplies an output signal.

In order to convert words of the state $S_0$ to words of the state $S_1$, the output signal of the series-to-parallel converter 7 is applied to a switchable reversing circuit 39 via a switchable inverter circuit 38. The inverter circuit 38 is switched on by the $-2$ disparity signal from counter 42 and the reversing circuit 39 by a signal formed by combining this $-2$ disparity signal and the gate 42 output signal by means of OR-gate 48, synchronization being effected by means of the word clock signal C.

In order to decode the words thus obtained, the circuit shown in FIG. 21 comprises a memory 49 which stores the modified Pascal triangle shown in FIG. 14, which is switched on by means of the signal $T_0$ and which is arranged in parallel with a memory circuit 50 which stores the modified Pascal triangle shown in FIG. 8 and which is switched on by the signal $T_1$.

The memory circuits 49 and 50 are row-addressed by the bit-clock signal b in such a way that at the beginning of the word, starting is effected at a row which corresponds to the 10th row of the Pascal triangle, which row is stepped through from bottom to top. These memory circuits 49 and 50 are column-addressed by an up/down counter 510 which receives the 10-bit words via a parallel-to-series converter 40 and consequently generates the instantaneous digital-sum-value within the word, in such a way that starting is effected in the specified starting column, i.e. the third column for the memory 49 and the fifth column for the memory 50, to proceed to a column of higher sequence number after every logic one. Simultaneously, under command of the bit clock, a start to a higher row is effected so that a step to the top right in the modified Pascal triangle is made in the same way as described with reference to FIGS. 14 to 19. Similarly, a logic zero results in a step to the top left. In accordance with the decoding method, the numbers in the modified Pascal triangle must be accumulated when a logic one occurs in the word. For this purpose, the circuit comprises an accumulator 51 and an adder circuit 52 which is controlled by the word on the output of the parallel-to-series converter 40 and, each time that a logic one occurs in said word, adds the contents of the instantaneously addressed memory location to the accumulator 51 contents, synchronized in such a way that the number is read out of the memory before the address is changed under command of the same logic one. In this way, the output word is generated as an 8-bit code word in the accumulator 51, which transfers its contents to the parallel-to-series converter 9 at the end of said word and is then reset. The shift over 89 of the words of group $T_1$ may then be effected by, for example, resetting the accumulator 51 to 89 at the end of every word or by adapting the contents of the memory 50.

In order to decode the words of group $T_2$, the words on the output of the reversing circuit 39 are applied in parallel to a memory 53 which is switched on by the signal $T_1$ and which, as a function thereof, generates to the 8-bit words, by reading out a table, which words together with the output words of the accumulator 51, are applied to the parallel-to-series converter 9 via a wired-OR, after which they applied to the output 10, said convert 9 being controlled by the clock signals a and c.

Synchronization must be effected by means of the clock signals a, b and c and, if required, by means of delay networks and hold circuits. For example, a 10-bit word is subject to a delay of one full word during its processing via the series-to-parallel converter 7, the inverting circuit 38, the reversing circuit 39, and the parallel-to-series converter 40, so that the generated signals $T_0$, $T_1$ and $T_2$ should be transferred via gates 54, 55 and 56 with a delay of one word length.

In the circuits shown in FIGS. 20 and 21, a memory circuit is required for each of the three groups $T_0$, $T_1$ and $T_2$, which may be undesirable because of the required storage capacity.

In order to avoid the use of the code table for the first group $T_2$, it is then necessary to find a method of extending the number of possible code words of zero disparity within the group $T_0$. In accordance with the table of FIG. 13, 89 code words of zero disparity in the group $T_0$ are used. The number of possibilities of forming a code word of zero disparity within the specified limits is 131 in the state $S_1$ and 197 in the state $S_0$. In order to enable a modified Pascal triangle to be used, it is then useful to start from the situation with the smallest number of possibilities, i.e. the state $S_1$, and when the initial state is $S_0$, to transpose these words into the state $S_1$. All the possibilities in state $S_1$ can then be used, so that a modified Pascal Triangle may be used, which requires an uninterrupted series of sequence numbers.

When considering the group $T_0$, it will be seen that only those code words are used whose instantaneous digital-sum-value lies between +1 and −2 from the beginning of the word. This means that in the state $S_1$, the words which have an instantaneous digital-sum-value of −3 or −4 are not utilized.

Figure 22:
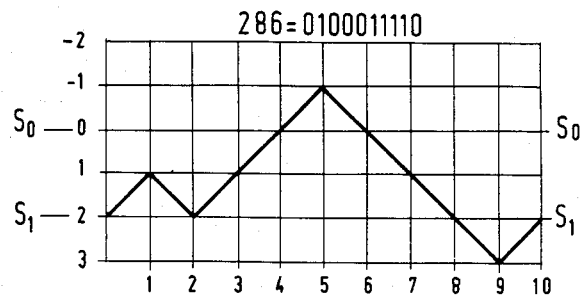
FIGS. 22 to 25 show a number of Trellis diagrams to explain the choice of some of the code words, which have been selected so that it is no longer necessary to store one group of code words in a memory.
Figure 23:
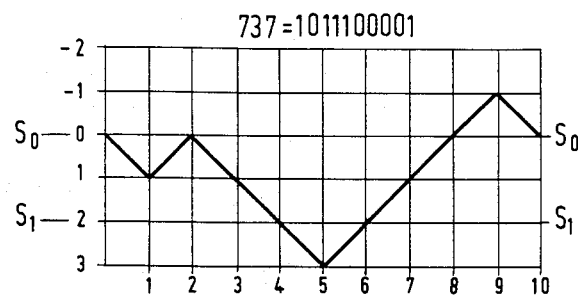

The words with an instantaneous digital sum value of −3, but not those with a value −4, can be mapped to the state $S_0$ by inversion alone. FIG. 22, by way of example, shows the variation of the word 286=0100011110 in the state $S_1$, which word reaches the level −1, i.e. an instantaneous digital-sum-value of −3. After inversion, which causes a change to 737=1011100001, it can be mapped to the state $S_0$, as shown in FIG. 23.

Figure 24:
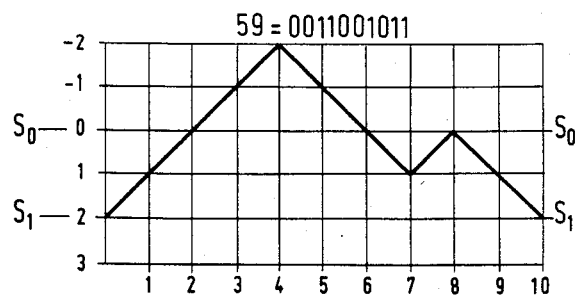
Figure 25:
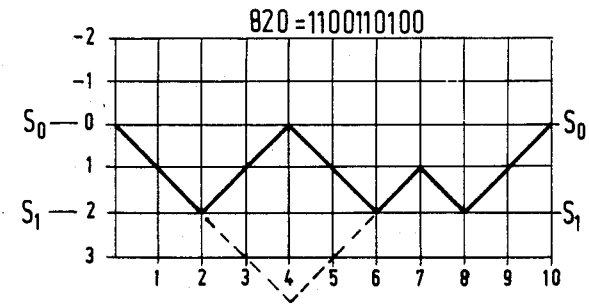

Words having an instantaneous digital sum value of −4 cannot be mapped directly to the state $S_0$ because they would reach the impermissible level 4 owing to inversion in the state $S_0$. In this state $S_0$, the levels −2, −1, 0 and +1 occur, as well as the level +3 owing to the inversion described above. Thus, those code words which reach the level +3 without having reached the level +2 are missing. These code words may then be mapped, for example, by "folding" the word about the level +2 after inversion, for example, by an additional inversion of the bits which follow when the +2 level is reached and by applying an additional inversion (in order to cancel the previous inversion) when this level is reached a second time, etc. FIG. 24, by way of illustration, shows the word 59=0011001011 which has an instantaneous digital-sum-value variation of −4 in the state $S_1$. This word can be mapped to the state $S_0$ in accordance with the rules described in the foregoing, yielding the word 820=1100110100, as is shown in FIG. 25.

In the manner described, all the possible code words in the state $S_1$ can be used, enabling a modified Pascal triangle having six columns to be used. As a result if this, 131 code words of zero disparity are found. Since also 155 code words of −2 disparity are available, this results in a total of 286 possible code words, while only 256 words are required. The surplus code words may, for example, be skipped without demanding additional storage capacity, by skipping them at the beginning or at the end of the sequence-number sequence, for example by starting to encode with the sequence number 19 and 0, respectively.

The group of code words thus found can then be encoded and decoded by means of a modified Pascal triangle having six columns. Since for the encoding and decoding of the group $T_1$ also a modified Pascal triangle having six columns is required, it is effective to combine the two, which is found to be possible when two end columns are employed. In that case, a starting column is selected (5th column corresponding to the state $S_1$; see also FIG. 18 an the description), and end column for words of zero disparity, i.e. the fifth column, and an end column for words of −2 disparity, i.e. the third column. In conformity with the rule that at the first row, the number one should be entered in the column to the right of the end column marked with an asterisk, the number one is now entered at the right of the two end columns, i.e. in the column 4 and 6, and further, the matrix is filled in accordance with the rules described with reference to FIGS. 14 to 19. This yields the matrix of FIG. 26, in which the non-relevant numbers are parenthesized and the positions which are not relevant because the matrix is stepped through diagonally, are left blank.

Figure 27:
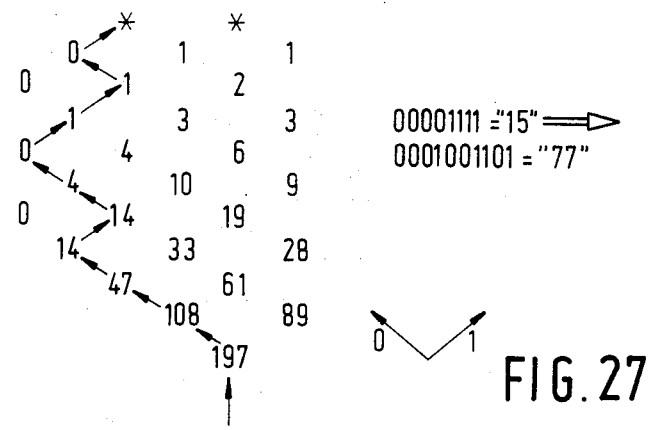
Figure 28:
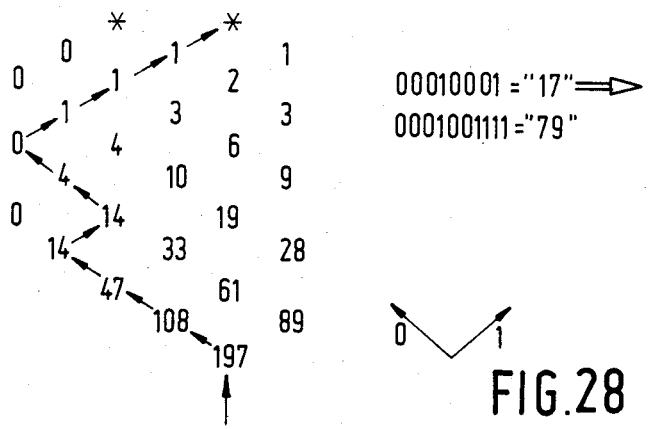

FIG. 27 illustrates the encoding and the decoding of the 8-bit word 15=00001111 into the 10-bit word 77=0001001101, which is a word of −2 disparity, and vice versa, and FIG. 28 illustrates the encoding and the decoding of the 8-bit word 17=00010001 into the 10-bit word 79=0001001111, which is a word of zero disparity, and vice versa, in conformity with the encoding and decoding rules described with reference to FIGS. 14 to 19.

Figure 26:
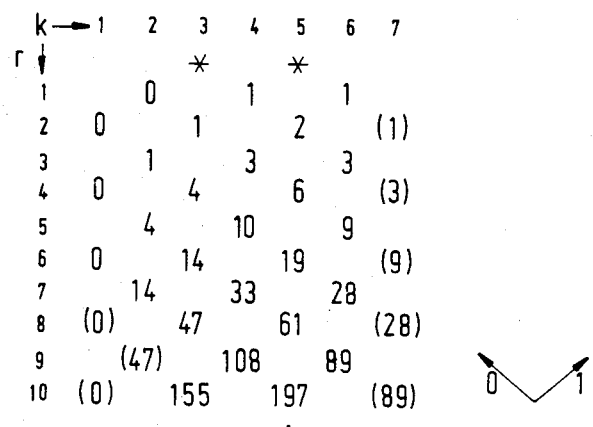
FIGS. 26 to 28 show a number of modified Pascal triangles to explain the encoding and decoding of all the code words by means of one modified Pascal triangle.
Figure 29:
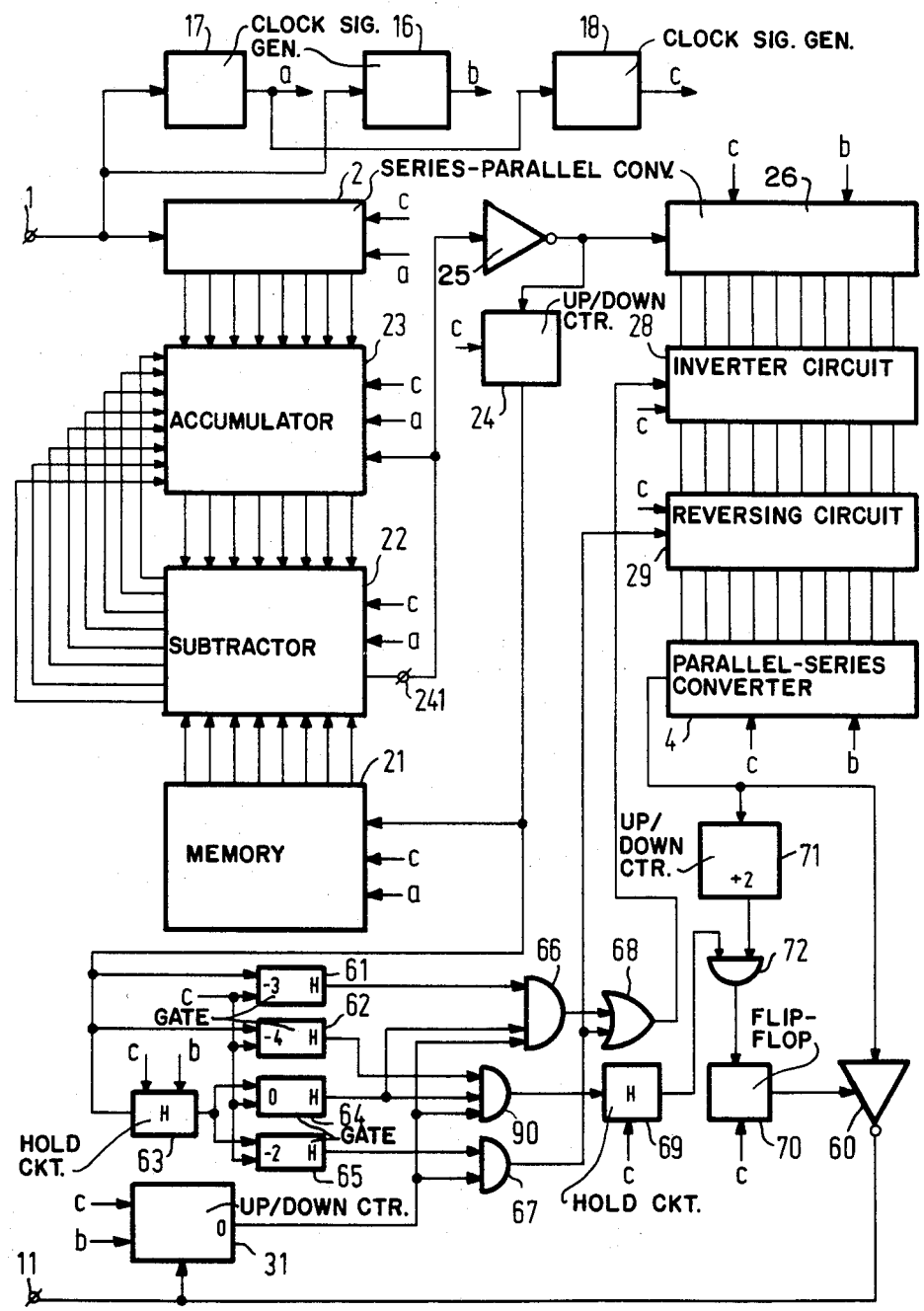
FIG. 29 shows an example of an encoding circuit based on the modified Pascal triangle shown in FIG. 26.

FIG. 29 shows an example of an encoding circuit based on the modified Pascal triangle of FIG. 26. Its principle corresponds to that of the circuit of FIG. 20 but in the present example, only one memory 21, in which the modified Pascal triangle of FIG. 26 is stored, is used, which is employed in conformity with FIG. 26, in which the inverting circuit 28 and the reversing circuit 29 are controlled differently as a function of the code words, and in which an inverter 60 is arranged between the parallel-to-series converter 4 and the output 11 in order to effect the "folding" about 2 described with reference to FIG. 25.

The generated code word, which becomes available as the overflow signal of the subtractor circuit 22 after inversion in the inverter 25, is applied to the up/down counter 24 to control the column addressing of the memory 22. The output signal is also applied to gate circuits with a latching function (flip-flop) 61 and 62, which detect whether said up/down counter 24 is in a −3 state and a −4 state, respectively. This output signal is also applied to a hold circuit 63 in order to hold the state of the counter 24 at the end of the word (the disparity). The disparity is detected by gates 64 and 65 with a latching function, which detect the states 0 and −2. In addition, in the same way as in the example of FIG. 20, the initial state ($S_0$ or $S_1$) is detected by means of the up/down counter 31. By means of AND-gate 66, the output signals of the gates 61, and 64 and counter 31 are combined, which AND-gate 66 therefore supplies an output signal which is indicative of a word which has reached or passed the level −3. While the disparity of this word is 0 and the state $S_0$. Such a word should then be inverted. The signals from the gate 65 and the counter 31 are combined by means of the AND-gate 67, which supplies a signal which is indicative of words of −2 disparity in the state $S_0$, i.e. words which must be inverted and reversed. For this purpose, the output signal of gate 67 is applied to the reversing circuit 29 and, after combination with the output signal of gate 66 by means of an OR-gate 68, also to the inverting circuit 28. The signals from gates 62 and 64 and from the counter 31 are combined by means of an AND-gate 90. This AND-gate 90 supplies a signal which is indicative of words of zero disparity which reach the level −4 while the initial state is $S_0$. These words have to be folded about +2. This can be effected by means of the inverter 60. However, after parallel-to-series conversion in the converter 4, the bit series has a delay of one word length relative to the bit series on the input of converter 26. Therefore, the signal from gate 90 is delayed by one word length with the hold circuit 69. The digital-sum-value variation within each word of the output signal of the converter 4 is determined by means of an up/down counter 71 and each time that the level +2 is reached, a signal is supplied. In AND-gate 72, this signal is combined with the output signal of the hold circuit 69. This AND-gate 72 controls a flip-flop 70 which changes over each time that the −2 level is reached during a word to be folded. This flip-flop 70 controls the inverter 60, to obtain the desired folding about +2.

Figure 30:
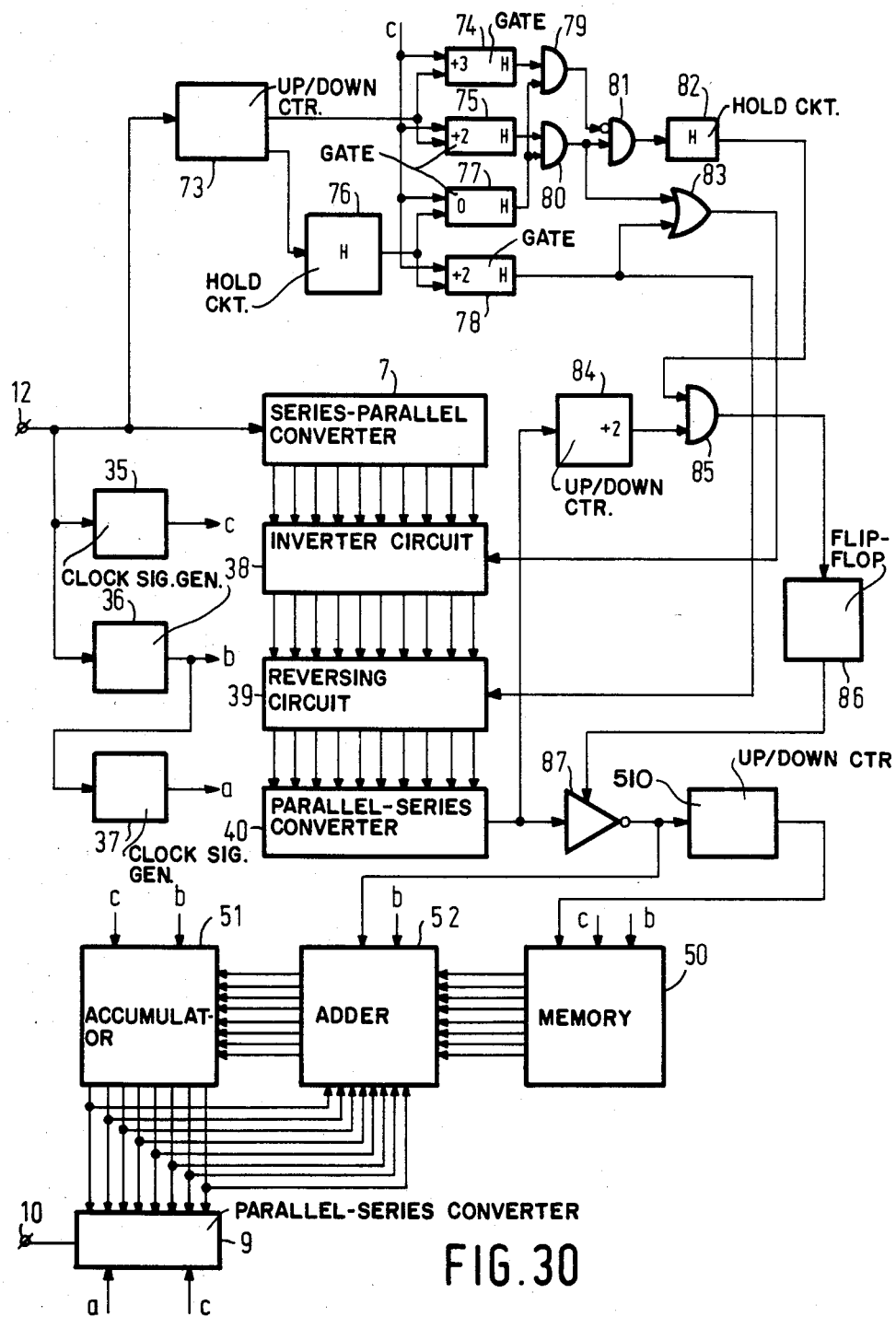
FIG. 30 shows an example of a decoding circuit based on the modified Pascal triangle shown in FIG. 26.

FIG. 30 shows an example of a decoder circuit for decoding words which have been encoded by means of the circuit shown in FIG. 29. The principle of this encoding circuit corresponds to that of the circuit shown in FIG. 21 but now only one memory circuit 50 is employed which stores the modified Pascal triangle shown in FIG. 26 and the inverting circuit and the reversing circuit are controlled differently as a function of the input signal.

The input signal is applied to an up/down counter 73. The output signal of this counter 13 is applied to gates 74 and 75 with a hold function in order to detect the counts +2 and +3, and also to a hold circuit 76 which holds the final count of said counter 73 at the end of every word, the gates 77 and 78, which have hold functions, detecting whether this final count is zero and +2, respectively. The output signals of gates 74 and 77 are combined in AND-gate 79, yielding a signal which is indicative of words of zero disparity which reach the +3 level. The output signals of gates 75 and 77 are combined by means of the AND-gate 80. This gate 80 supplies a signal which is indicative of words of zero disparity which reach or pass the +2 level, i.e. words which have been inverted only or which have been inverted and folded. This signal is combined with the inverted output signal of gate 79 in AND-gate 81, which then supplies a signal which is indicative of words which have been folded about +2, which signal is applied to hold circuit 82 to be held for one word length. The output signal of gate 78 is indicative of words of +2 disparity, i.e. words which have been inverted and reversed. This signal is applied to the reversing circuit 39 and, after having been combined with the output signal of gate 80 by means of OR-gate 83, to the inverting circuit 38.

The output signal of the series-to-parallel converter 40 is monitored by means of the up/down counter 84 to supply a signal each time that the count +2 is reached within a word, which output signal is combined with the signal from the hold circuit 82 by means of the AND-gate 85 and is subsequently applied to the flip-flop 86 which changes over an inverter 87 arranged between the converter 40 and the adder 52.

With respect to the arrangement shown in FIGS. 20, 21, 29 and 30, it is to be noted that in practice, the encoding circuit (FIGS. 20 or 29) can be combined to a large extent with the decoding circuit (FIGS. 21 or 30) because these circuits comprise many identical components.

As regards the generation of the word-synchronizing signal c (generator 35 in FIGS. 21 and 30), it is to be noted that steps may be taken to ensure that this signal remains in phase with the data words by adding synchronizing words which are unique within the sequence of code words and which cannot be desired from adjoining parts of consecutive code words. For this purpose, it may be necessary, for example in the Table shown in FIG. 13, to inhibit a number of code words. For this purpose the table of FIG. 31 shows those information words (i) of the table of FIG. 13 which have been modified to enable the use of the synchronizing words 0100111110 and 0000111110.

What is claimed is:

1. A method of transmitting information, which comprises converting n-bit information words into m-bit code words before transmission and reconverting said m-bit code words into n-bit information words after transmission, and which further comprises for converting consecutive n-bit information words into m-bit code words with a limited maximum disparity ±d prior to transmission, where n, m and d are integers which comply with n<m and d<m, in such a way that a digital-sum-valve taken over all the preceding code words at the beginning of a code word remains limited to a range which is bounded by a first and a second value, selecting the following code word, at least with respect to the polarity of a disparity thereof, as a function of said digital-sum-value over all the preceding code words so as to ensure that said following code word cannot cause an increase of the absolute value of said digital-sum-value, for which purpose said method comprises assigning a pair of code words to at least a first group of possible n-bit information words, the code words of said pair having opposite disparities with an absolute value d and being the bit-by-bit inverse of one another for each associated information word, characterized in that for limiting the instantaneous digital-sum-value to a range which is bounded by a third and a fourth value, which third and which fourth value are situated outside the range bounded by the first and the second value in such a way that the spacing between the second and the fourth value is smaller than the spacing between the third and the first value, said method comprises assigning first and second code words with a disparity +d and −d, respectively, to at least a part of the first group of information words, which second code words for every associated information word are the bit-by-bit inverses of the first code words whose transmission sequences have been reversed, said first code words having been selected from at least that group of code words which, in conformity with said selection rule, remain within the range which is bounded by the third and the fourth value, while the corresponding bit-by-bit inverted code word does not remain with said range and after reversal of the transmission sequence does remain with said range.

2. A method as claimed in claim 1, characterized in that after transmission of the code words, said method comprises checking whether the code words exhibit a disparity +d or −d, and converting directly or after bit-by-bit inversion and reversal of the transmission sequence, depending on the polarity of the disparity, code words belonging to said pair of the first group of information words.

3. A method as claimed in claim 1 or 2, wherein the maximum disparity ±d is equal to the minimum possible disparity and is unequal to zero, so that the digital-sum-value taken over all the preceding code words at the beginning of a code word remains limited to either the first value or the second value, which values are spaced from each other, and the first code words which belong to the first group of information words cause said digital-sum-value to vary from the first value to the second value, while the associated second code words cause said digital sum value to vary from the second value to the first value, characterized in that said method further comprises selecting from the first code words to encode, an information word of the first group if the digital-sum-value exhibits the first value at the beginning of the code word, and selecting the bit-by-bit inverse of the code word whose transmission sequence has been reversed if the digital-sum-value exhibits the second value at the beginning of the code word.

4. A method as claimed in claim 3, wherein the maximum disparity ±d is equal to ±2 and code words of zero disparity are assigned to a second group of information words, characterized in that said method further comprises selecting said code words independently of the digital-sum-value at the beginning of the code word, which do not exceed the third value when they vary from the first value to the first value, and which do not exceed the fourth value when they vary from the second value to the second value.

5. A method as claimed in claim 4, characterized in that n=8 and m=10 and the third value is situated at a spacing 2 from the first value and the fourth value is situated at a spacing 1 from the second value.

6. An encoding device for converting n-bit information words into m-bit code words with a limited maximum disparity ±d prior to transmission, where n, m and d are integers which comply with <m and d <m, in such a way that a digital-sum-vaue taken over all the preceding code words at the beginning of a code word remains limited to a range which is bounded by a first and a second value, in which the following code word is selected, at least with respect to the polarity of the disparity, as a function of said digital-sum-value over all the preceding code words so as to ensure that said following code word cannot cause an increase of the absolute value of said digital-sum-value, for which purpose a pair of code words is assigned to at least a first group of possible n-bit information words, the code words of said pair having opposite disparities with an absolute value d and being the bit-by-bit inverse of one another for each associated information word, characterized in that said encoding device comprises means for determining the digital-sum-value taken over all the preceding words; means for converting the information words of the first group; and means for inverting and reversing the code words obtained by converting information words of the first group if this is required by the digital-sum-value thus determined.

7. A decoding device for converting m-bit code words into n-bit information words, said m-bit code words having been formed by said encoding device as claimed in claim 6, characterized in that said decoding device comprises means for determining the disparity of the code words received;
means for inverting and reversing the code words which correspond to information words of the first group if this is required by the disparity found; and
means for converting the code words corresponding to information words of the first group.

* * * * *

UNITED STATES PATENT AND TRADEMARK OFFICE
CERTIFICATE OF CORRECTION

PATENT NO. : 4,620,311
DATED : October 28, 1986
INVENTOR(S) : Kornelis A. Schouhamer Immink It is certified that error appears in the above-identified patent and that said Letters Patent is hereby corrected as shown below:

IN THE CLAIMS

Claim 2, line 7     change "pair" to

--part--

Signed and Sealed this

Fifteenth Day of November, 1988

Attest:

DONALD J. QUIGG

Attesting Officer     Commissioner of Patents and Trademarks